United States Patent
Whitby-Strevens et al.

(10) Patent No.: US 10,114,781 B2
(45) Date of Patent: Oct. 30, 2018

(54) CONTACT CORROSION MITIGATION

(71) Applicant: Apple Inc., Cupertino, CA (US)

(72) Inventors: Colin Whitby-Strevens, Ben Lomond, CA (US); Kevin M. Keeler, Goleta, CA (US); Christophe B. Daniel, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/243,824

(22) Filed: Aug. 22, 2016

(65) Prior Publication Data

US 2017/0124010 A1 May 4, 2017

Related U.S. Application Data

(60) Provisional application No. 62/208,489, filed on Aug. 21, 2015.

(51) Int. Cl.
*G06F 3/00* (2006.01)
*G06F 13/38* (2006.01)
*G06F 13/42* (2006.01)
*G06F 11/30* (2006.01)
*G06F 13/40* (2006.01)

(52) U.S. Cl.
CPC ........ *G06F 13/385* (2013.01); *G06F 11/3041* (2013.01); *G06F 11/3048* (2013.01); *G06F 11/3051* (2013.01); *G06F 13/4068* (2013.01); *G06F 13/4282* (2013.01)

(58) Field of Classification Search
USPC ................... 710/8, 15–19, 300–306
See application file for complete search history.

(56) References Cited

U.S. PATENT DOCUMENTS

| | | | |
|---|---|---|---|
| 9,535,117 B2* | 1/2017 | Menon | G01R 31/3177 |
| 2016/0190794 A1* | 6/2016 | Forghani-Zadeh | H02H 7/20 361/86 |
| 2017/0344508 A1* | 11/2017 | Setiawan | G06F 13/4282 |

OTHER PUBLICATIONS

Universal Serial Bus Type-C Cable and Connector Specification (Revision from Apr. 3, 2015), USB 3.0 Promoter Group, Mar. 25, 2016, 248 pages.
Universal Serial Bus Type-C Cable and Connector Specification (Revision 1.0), USB 3.0 Promoter Group, Aug. 11, 2014, 171 pages.
Universal Serial Bus Type-C Cable and Connector Specification (Revision 1.2), USB 3.0 Promoter Group, Mar. 25, 2016, 221 pages.

* cited by examiner

*Primary Examiner* — Raymond Phan
(74) *Attorney, Agent, or Firm* — Kilpatrick Townsend & Stockton, LLP

(57) ABSTRACT

Methods, structures, and apparatus that limit the amount of dendritic growth and metal migration between contacts in order to prevent an erroneous detection of a connection and/or functional failure. One example may reduce dendritic growth and metal migration by limiting an amount of time that a connection detection voltage is applied to CC contacts of a USB Type-C connector when an electronic device is detecting a connection. This and other examples may further limit dendritic growth by not applying the connection detection voltage to the CC contacts for a first duration following a detection of a disconnection.

16 Claims, 11 Drawing Sheets

Figure 3:
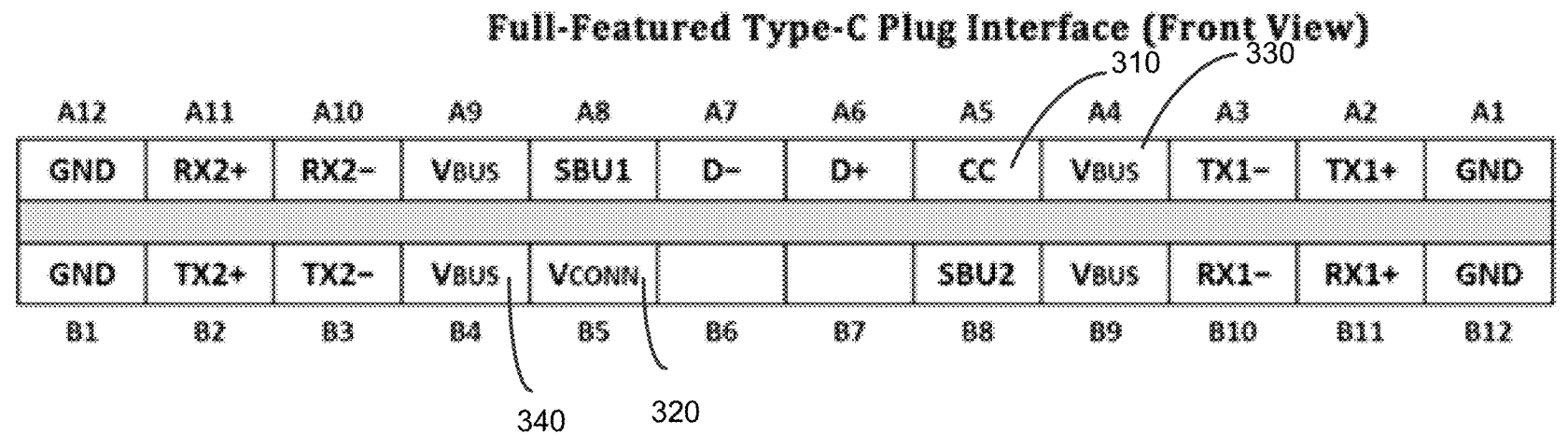

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC | D+ | D− | SBU1 | VBUS | RX2− | RX2+ | GND |

Full-Featured Type-C Plug Interface (Front View) — 310, 330

| B1 | B2 | B3 | B4 | B5 | B6 | B7 | B8 | B9 | B10 | B11 | B12 |
|---|---|---|---|---|---|---|---|---|---|---|---|
| GND | TX2+ | TX2− | VBUS | VCONN | | | SBU2 | VBUS | RX1− | RX1+ | GND |

CONTACT CORROSION MITIGATION

CROSS REFERENCE TO RELATED APPLICATIONS

This application claims the benefit of U.S. provisional patent application No. 62/208,489, filed Aug. 21, 2015, which is incorporated by reference.

BACKGROUND

The amount of data transferred between electronic devices has grown tremendously the last several years. Large amounts of audio, streaming video, text, and other types of data content are now regularly transferred among desktop and portable computers, media devices, handheld media devices, displays, storage devices, and other types of electronic devices.

Power may be transferred with this data, or power may be transferred separately. Power and data may be conveyed over cable assemblies. Cable assemblies may include a cable that may have wire conductors, fiber optic cables, or some combination of these or other conductors. Cable assemblies may include a connector insert at each end of the cable, though other cable assemblies may be connected or tethered to an electronic device in a dedicated manner. The connector inserts of the cable assemblies may be inserted into receptacles in communicating electronic devices to form power and data pathways between them.

When a device is disconnected, a connector receptacle in the device may be exposed to the local environment. At other times, a cable insert at a first end of a cable may be inserted into the connector receptacle and a cable insert at a second end of a cable may be exposed to the local environment. Also, when a device has a tethered cable, the far end of the tethered cable may be similarly exposed. For example, the connector receptacle or insert may be exposed to liquid or moisture. Liquid may be spilled directly on contacts of a connector receptacle or connector insert. An end of a cable may be set down in a pool or puddle or liquid. Moisture may accumulate on a connector receptacle or connector insert in a high-humidity environment. A connector receptacle or connector insert may be moved from a warm location to a cooler one. This temperature change may cause humidity in the environment to condense, and the resulting moisture to accumulate on the contacts in the connector receptacle or connector insert.

This liquid or moisture may cause the growth of dendrites between two or more contacts in the presence of an electric field. Specifically, where an electric field exists between two or more contacts, dendrites may grow between the two contacts. This growth may reduce an impedance between the two contacts. When the two contacts include one of the connection detection contacts in a USB-Type-C™ connector, an electronic device connected to, or housing, the connector may erroneously detect a connection to a second electronic device where no such connection exists. This erroneous detection of a connection may result immediately from the low resistance effect of the liquid or moisture, or may be delayed for a period of time until the growth of a dendrite has proceeded sufficiently to lower the resistance to a point where such an erroneous detection may occur. When such an erroneous detection of a connection occurs, then the system may enable power or signaling on other contacts in the connector, resulting in further dendritic growth on these other contacts. Initially, the dendrites are incomplete and/or fragile, and likely to be dislodged by physical use of the connector. However, after sufficient dendritic growth, permanent functional failure of the connector can result.

Thus, what is needed are methods, structures, and apparatus that limit the amount of dendritic growth between contacts in order to avoid permanent functional failure of the connector.

SUMMARY

Accordingly, embodiments of the present invention may provide methods, structures, and apparatus that limit the amount of dendritic growth and metal migration between contacts in order to avoid permanent functional failure of the connector. An illustrative embodiment of the present invention may limit dendritic growth by limiting an amount of time that a connection detection voltage is applied to connection detection contacts of a USB Type-C connector when an electronic device is detecting a connection. These and other embodiments of the present invention may further limit dendritic growth by not applying a voltage to the connection detection contacts for a first duration following a detection of a disconnection.

In USB Type-C connection systems, a dedicated downward-facing port may apply a voltage through resistors to the connection detection contacts. These contacts are referred to as CC1 and CC2 contacts in the USB Type-C specification, and are generally referred to as the CC contacts here. When the downward-facing port is connected to an upward-facing port, a resistor connected between ground and one of the CC contacts on the upward-facing port may form a resistor divider with one of the resistors in the downward-facing port. This resistor divider may generate an intermediate voltage on a CC contact in the downward-facing port and a CC contact in the upward-facing port. This intermediate voltage may be used by each device to detect a connection between them. When the downward-facing port is disconnected, either because no cable is plugged into its connector or because a far end of a cable is disconnected, the downward-facing port may continue to apply the voltage through the resistors to one or more exposed CC contacts, either in the connector receptacle or in the connector insert at a far end of a cable connected to the connector receptacle. Accordingly, an electric field may be present between the CC contacts and one or more adjoining contacts (or a shield.) When liquid or moisture is present, this electric field may encourage the growth of dendrites. This dendritic growth may reduce the impedance between the CC contacts and ground. This reduced impedance may appear to the downward-facing port to be a resistor to ground, and the reduced impedance may drive the CC contact to an intermediate voltage. The detection of the intermediate voltage may then cause the downward-facing port to erroneously detect a connection.

Accordingly, an illustrative embodiment of the present invention may limit or mitigate this growth by limiting the amount of time that a dedicated downward-facing port applies a voltage through resistors to the CC contacts. In an illustrative embodiment of the present invention, a dedicated downward-facing port may apply a voltage through resistors to the CC contacts using approximately a 50 percent duty cycle. In these or other embodiments of the present invention, a dedicated downward-facing port may apply a voltage through resistors to the CC contacts using a duty cycle that is between 30 and 70 percent, where the actual duty cycle used is chosen in a pseudo-random manner. That is, a dedicated downward-facing port may apply a voltage through resistors to the CC contacts between 30 and 70 percent of the time. When a voltage is not being applied, the CC contacts may be in a high-impedance mode. This high impedance may prevent a dual-role port that is connected from erroneously determining that the dedicated downward-facing port is an upward-facing port.

When a dedicated downward-facing port erroneously detects a connection, it may power up its VBUS power supply. This ramping up of the VBUS power supply may, in turn, be shorted via the liquid or moisture that is present at a CC contact, and consequently raise the voltage on a CC contact such that a disconnection is detected by the downward-facing port. This event may cause VBUS to drop to ground, which may allow a voltage on the CC contact to similarly drop. This drop in voltage on the CC contact may cause the dedicated downward-facing port to detect a connection, thereby repeating the above sequence of events. This powering on of the VBUS power supply and the application of a voltage to the CC contact may cause further dendritic growth and increase the likelihood of further damage to the contacts.

Accordingly, an illustrative embodiment of the present invention may prevent a dedicated downward-facing port from detecting a connection for a first duration following a detected disconnection. In various embodiments of the present invention, this first duration may be different amounts of time. For example, this duration may be 0.5, 1.0, 1.5, or 2.0 seconds or other duration in length.

In USB Type-C connection systems, a device having a dual-role port may alternate between applying a voltage through resistors to CC contacts and applying ground through the resistors to the CC contacts. That is, a dual-role port may alternate between acting as a downward-facing port and an upward-facing port. In this case, a dual-role port is already limiting the amount of time that an electric field is applied to the CC contacts and adjoining contacts and shield. In a manner similar to the above, a dual-role port may also erroneously detect a connection, either immediately as a result of the liquid or moisture present, or after a period of time during which a dendrite has started to grow. Accordingly, in an illustrative embodiment of the present invention, no further limitations are imposed. These and other embodiments of the present invention may prevent a dual-role port acting as a downward-facing port from detecting a connection for a first duration following a detected disconnection of a upward-facing port in order to limit or mitigate dendritic growth and metal migration, as is done with dedicated downward-facing ports.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 3 illustrates a pinout for a USB Type-C connector insert that may be improved by the incorporation of an embodiment of the present invention;

DESCRIPTION OF ILLUSTRATIVE EMBODIMENTS

Figure 1:
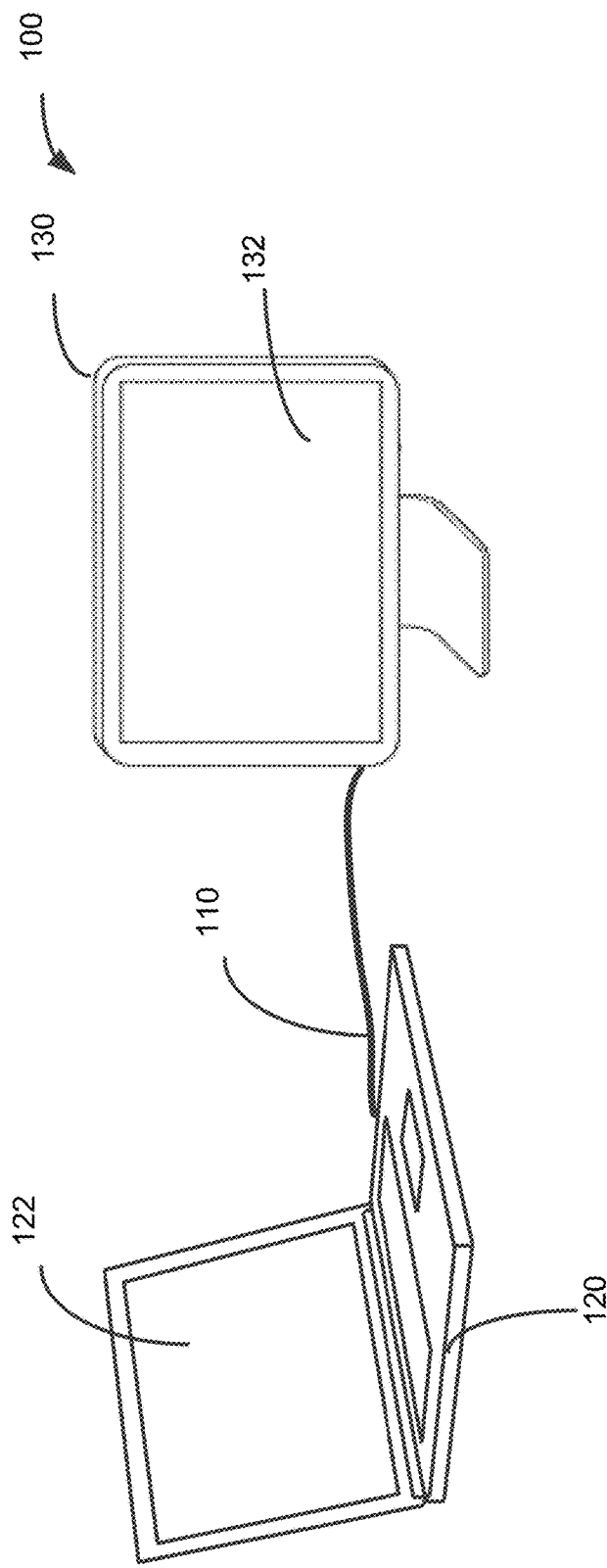
FIG. 1 illustrates an electronic system that may be improved by the incorporation of embodiments of the present invention.

FIG. 1 illustrates an electronic system that may be improved by the incorporation of embodiments of the present invention. This figure, as with the other included figures, is shown for illustrative purposes and does not limit either the possible embodiments of the present invention or the claims.

Electronic system 100 may include cable 110 joining electronic devices 120 and 130. In this example, electronic device 120 may be a laptop or portable computer having screen 122. Electronic device 130 may be a monitor 130 that may include screen 132. In other embodiments of the present invention, cable 110 may couple various types of devices, such as portable computing devices, tablets, desktop computers, all-in-one computers, cell phones, smart phones, media phones, storage devices, portable media players, navigation systems, monitors power supplies, adapters, and chargers, and other devices. These cables, such as cable 110, may provide pathways for signals and power compliant with USB Type-C interfaces. Cable 110 may attach to electronic devices 110 and 130 through interface ports provided by embodiments of the present invention.

In this example, device 120 may be disconnected from device 130 by unplugging cable 110 from device 120. In this case, contacts on a USB Type-C receptacle in device 120 may be exposed. In other examples, device 120 may be disconnected from device 130 by unplugging cable 110 from device 130. In this case, contacts on a connector insert at an end of cable 110 may be exposed. These exposed contacts may come into contact with liquid or other moisture. For example, a liquid may be spilled on these contacts. These contacts may be exposed to moisture by being located in a high humidity environment. These contacts may be moved from a warm environment to a cool one and the resulting temperature change may foster the accumulation of moisture on the contacts. An end of cable 110 may be set down in a pool or puddle of liquid. Subjecting these moisture exposed contacts to an electric field may encourage metal migration and dendritic growth between the contacts. The following figures illustrate connector receptacle and connector insert contacts that may be susceptible to dendritic growth.

Figure 2:
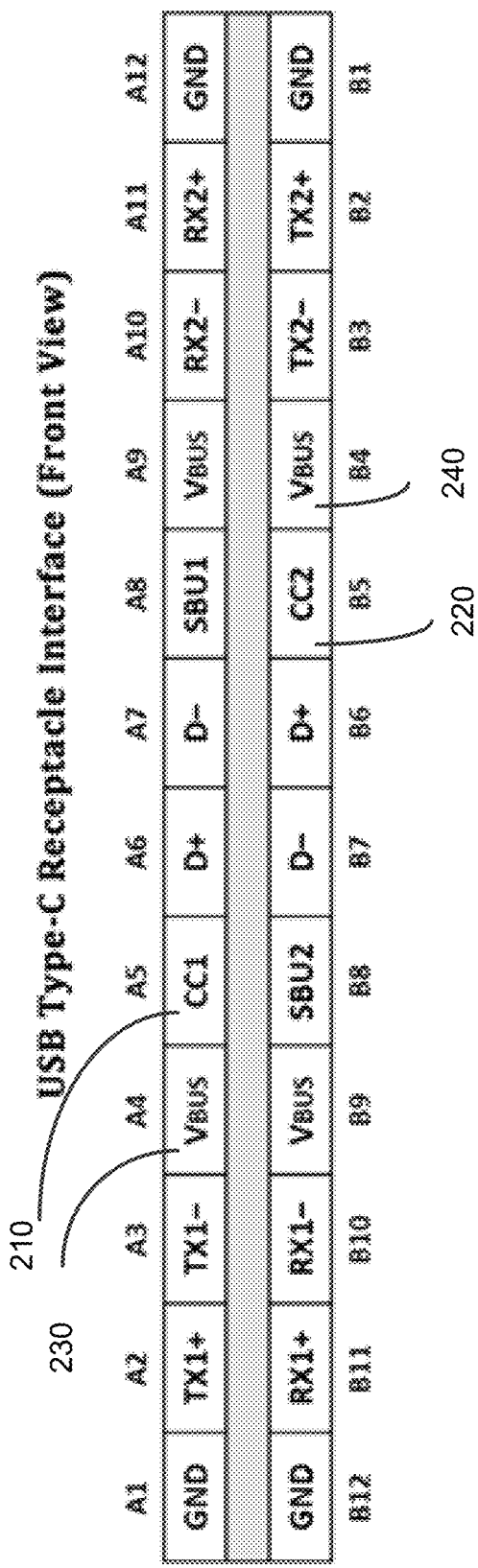
FIG. 2 illustrates a pinout for a USB Type-C connector receptacle that may be improved by the incorporation of an embodiment of the present invention.

FIG. 2 illustrates a pinout for a USB Type-C connector receptacle that may be improved by the incorporation of an embodiment of the present invention. This USB Type-C receptacle may employ two contacts, CC1 210 and CC2 220, to determine whether a connection has been formed. These contacts may be near VBUS contacts 230 and 240. VBUS contacts 230 and 240, as well as other adjoining contacts and a surrounding shield, may be at a ground potential until the presence of a connection to this connector receptacle is detected.

Currently, before a connection is detected, a dedicated downward-facing port may apply a continuous voltage through a first resistor to CC1 210 and through a second resistor to CC2 220. These voltages may generate an electric field between CC1 210 and CC2 220 and adjoining contacts and a shield, which again may be at ground. This electric field may cause the growth of dendrites, which may reduce an impedance from contacts CC1 210 and CC2 220 to ground. This reduced impedance may cause a false detection of a connection to this connector receptacle, or, if sufficiently low, a complete malfunction of the interface.

FIG. 3 illustrates a pinout for a USB Type-C connector insert that may be improved by the incorporation of an embodiment of the present invention. This USB Type-C connector insert may employ CC contact 310 for determining the presence and orientation of a connection. CC contact 310 may be adjacent to VBUS contact 330. This USB Type-C connector insert may include a VCONN contact 320 for accepting secondary (local) power. VCONN contacts 320 may be adjacent to VBUS contact 340. VBUS contact 330, as well as other adjoining contacts and a surrounding shield, may be at a ground potential until the presence of a connection to this connector receptacle is detected.

Currently, before a connection is detected, a dedicated downward-facing port of a connector receptacle connected to this connector insert may apply a continuous voltage through a first resistor to its CC1 and CC2 contacts, as shown above. One of the contacts CC1 and CC2 may connect to CC contact 310 of this connector insert. A USB Type-C cable may have a conductor to join the CC contacts 310 at each end. Accordingly, a CC contact 310 may be exposed an electric field between CC contact 310 and adjoining pins and shield, which again may be at ground. This electric field may cause the growth of dendrites, which may reduce and impedance from the CC contact 310 to ground. This reduced impedance may cause a connector receptacle to detect a false connection to this connector insert, or, if sufficiently low, a complete malfunction of the interface.

Figure 4:
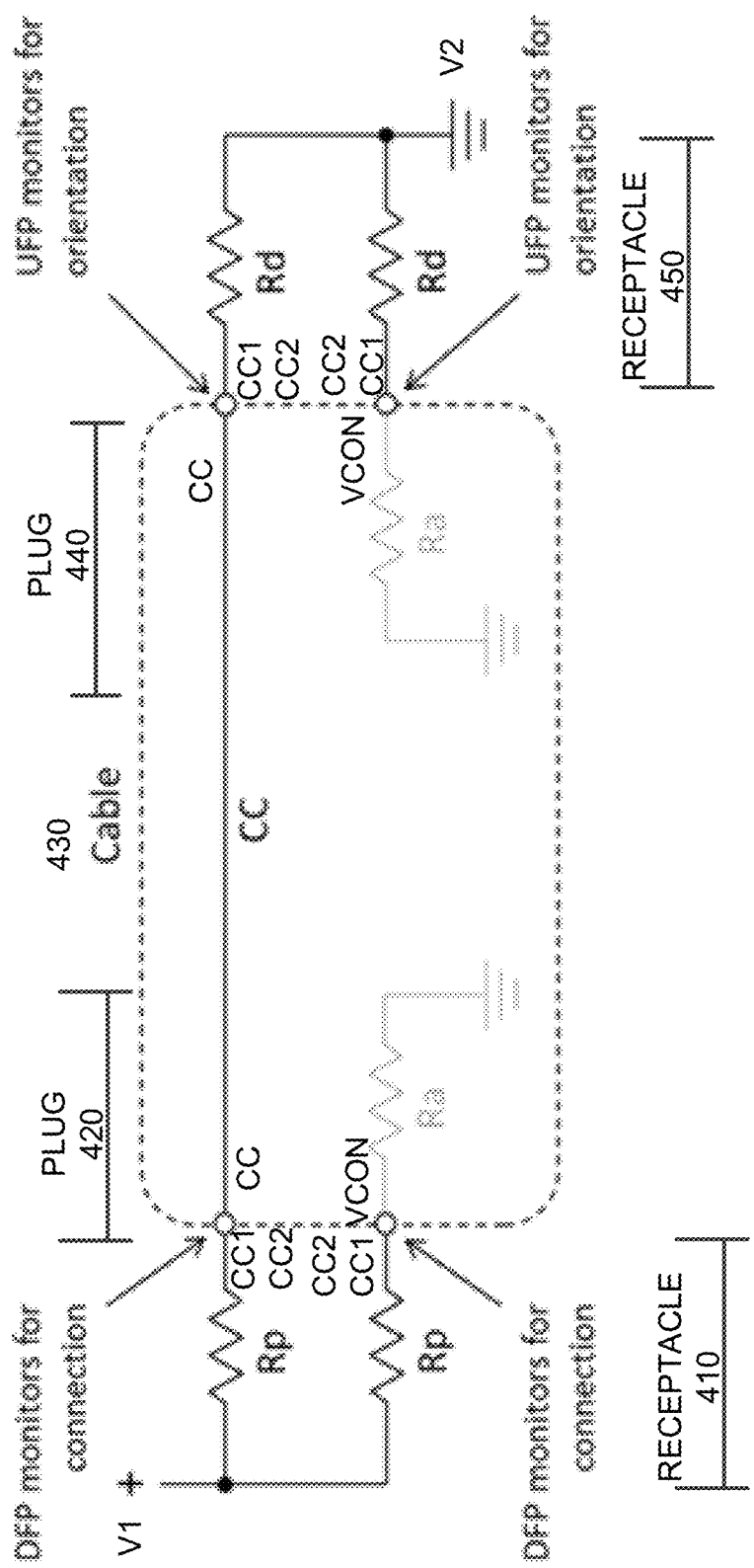
FIG. 4 illustrates connection and orientation detection circuitry for a USB Type-C connector system that may be improved by the incorporation of an embodiment of the present invention.

FIG. 4 illustrates connection and orientation detection circuitry for a USB Type-C connector system that may be improved by the incorporation of an embodiment of the present invention. In this example, a connector receptacle 410 in a first device, such as electronic device 120 in FIG. 1, may be mated with a plug or connector insert 420. Cable 430 may connect connector insert 420 to plug or connector insert 440. Connector insert 440 may be mated with connector receptacle 450 in a second device, such as electronic device 130 in FIG. 1.

When connector receptacle 410 is part of a dedicated downward-facing port or a dual-role port acting as a downward-facing port, a voltage V1 may be applied through resistors RP to contacts CC1 and CC2. Connector insert 420 may include a CC contact. This CC contact may mate with either contact CC1 or CC2 in connector receptacle 410, depending on an orientation of connector insert 420. The CC contact in connector insert 420 may be electrically connected to a CC contact in connector insert 440 by a conductor in cable 430. The CC contact in connector insert 440 may connect to either CC1 or CC2 in connector receptacle 450, again depending on the orientation of connector insert 440. Connector receptacle 450 may provide pulldown resistors RD from contacts CC1 and CC2 to ground. While this and the other included examples show the use of pull-up resistors RP, in these and other embodiments of the present invention, other circuit techniques may be used. For example, in these and other embodiments of the present invention, other circuits, such as current sources, may be used.

When a connector receptacle 450 is connected, a pulldown resistor RD in connector receptacle 450 may form a resistor divider with a resistor RP in connector receptacle 410. This resistor divider may generate an intermediate voltage between V1 and ground that may be detected by the downward-facing port. The downward-facing port may then power up its power supplies. The upward-facing port in connector receptacle 450 may also see this intermediate voltage and determine the orientation in which it is connected to the downward-facing port in connector receptacle 410.

Again, the second device that includes connector receptacle 450 may be disconnected either by disconnecting connector insert 440 from connector receptacle 450 or by disconnecting connector insert 420 from connector receptacle 410. When connector insert 440 is removed from connector receptacle 450, dendritic growth between CC and ground in connector insert 440 may begin to mimic the presence of resistor RD. This dendritic growth may cause an intermediate voltage to be seen at either the CC1 or CC2 contacts in connector receptacle 410. This intermediate voltage may cause the downward-facing port to mistakenly detect a connection, or, if sufficiently low, a complete malfunction of the interface.

When connector insert 420 is removed from connector receptacle 410, dendritic growth on contacts CC1 or CC2 in connector receptacle 410 may again mimic the presence of a resistor RD. This dendritic growth may cause an intermediate voltage to be seen at either of the CC1 or CC2 contacts in connector receptacle 410. This intermediate voltage may cause the downward-facing port to mistakenly detect a connection, or, if sufficiently low, a complete malfunction of the interface.

In this example, the VCONN contacts in connector receptacle 410 and connector receptacle 450 may be used to receive power in order to power circuitry in the connector insert 420 or connector insert 440, respectively.

In this example, connector receptacle 410 is shown as a dedicated downward-facing port, while connector receptacle 450 is shown as a dedicated upward-facing port. Accordingly, V1 is fixed as a positive supply and V2 is fixed as ground. In other embodiments of the present invention, either or both of these ports may be dual-role ports. A dual-role port may operate as either a downward-facing port or an upward-facing port, depending on system configuration. During connection detection, a dual-role port may alternately behave as a downward-facing port and an upward-facing port until a connection is found. In this example, when connector receptacle 410 is a dual-role port, V1 may alternate between providing a positive supply and ground until a connection is found. Similarly, V2 in connector receptacle 450 may alternate between providing a positive supply and ground until a connection is found. An example of a voltage waveform that may be used for V1 and V2 in a dual-role port is shown in the following figure.

Figure 5:
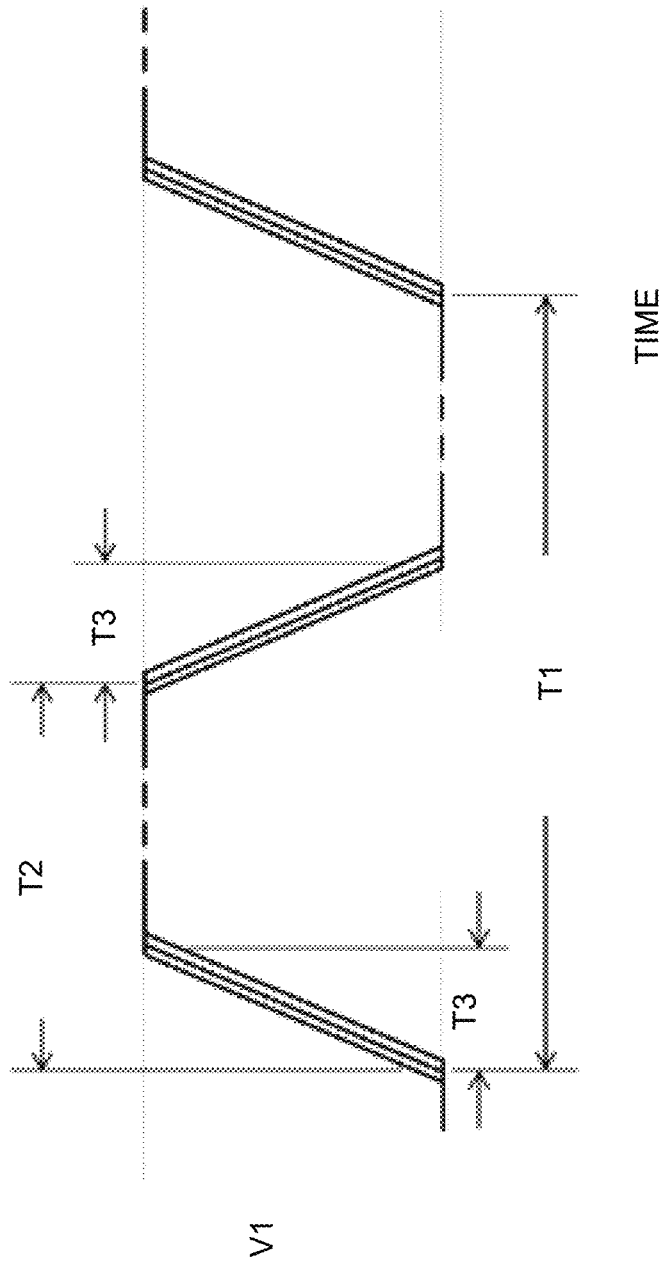
FIG. 5 illustrates a voltage waveform that may be used to generate a voltage to be applied through resistors to CC1 and CC2 contacts in a dual-role port that may be improved by an embodiment of the present invention.

FIG. 5 illustrates a voltage waveform that may be used to generate a voltage to be applied through a resistor to CC1 and CC2 contacts in dual-role port that may be improved by an embodiment of the present invention. In this example, V1 may alternate between a low voltage, typically ground, and a high voltage. The alternating waveform may have cycle time T1 that is between 50 and 100 ms. It may stay in a specific state for a duration T2 that is between 30 and 70 percent of T1 and have a transition time T3 of 0 to 1 ms.

As dendrites grow between a CC, CC1, or CC2 contact and ground, the contact voltage may drop. The contact voltage may reach a first threshold at which a dedicated downward-facing port, or a dual-role port acting as a downward-facing port, erroneously detects a connection. An embodiment of the present invention may take steps to mitigate this dendritic growth such that a voltage on a CC1 or CC2 contact does not reach a second threshold voltage at which a port may try to deliver power to a connector insert. An example showing a voltage on a CC, CC1, or CC2 contact as a function of dendritic growth time is shown in the following figure.

Figure 6:
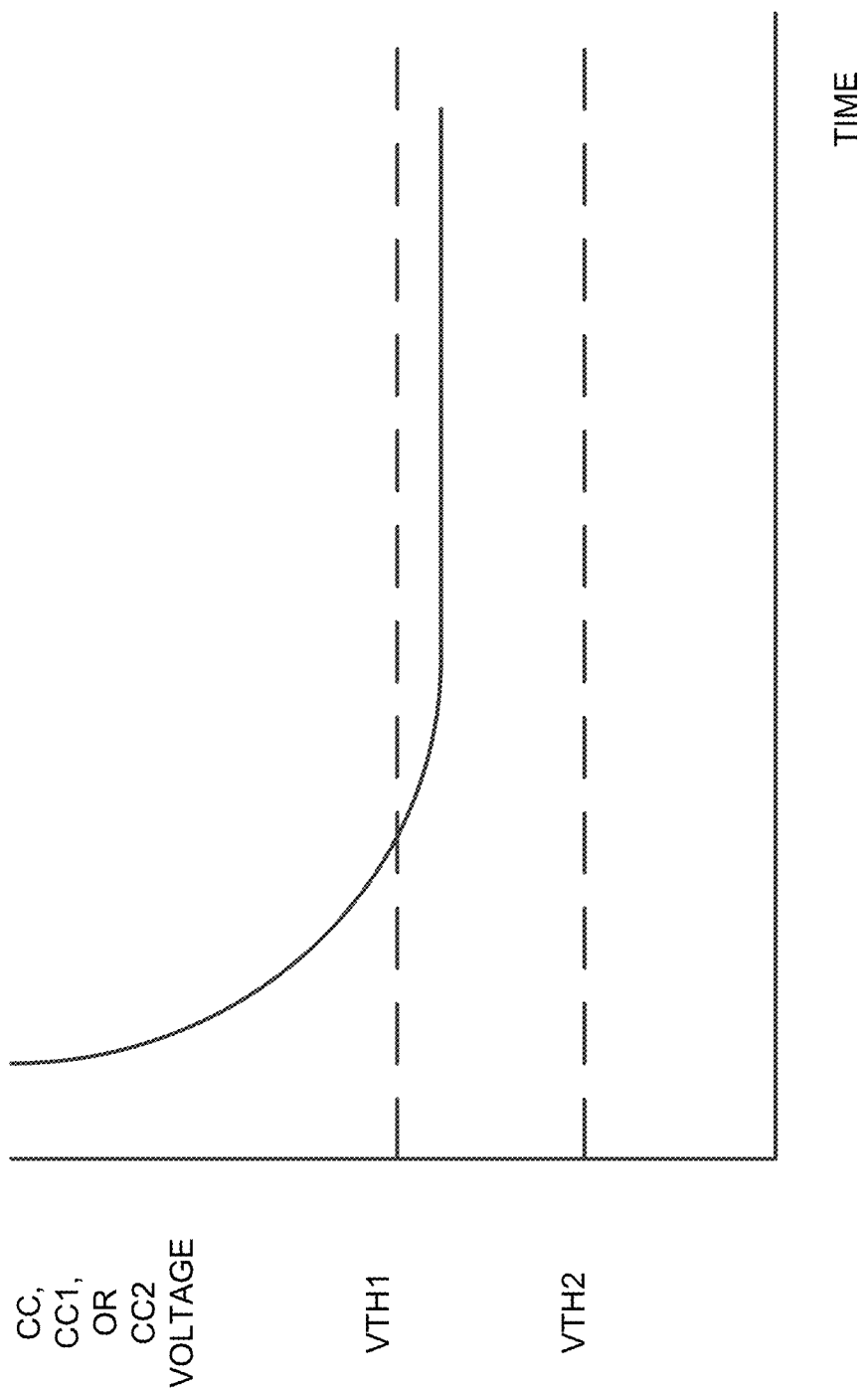
FIG. 6 illustrates a voltage decay on a CC contact as a function of dendritic growth time according to an embodiment of the present invention.

FIG. 6 illustrates a voltage decay on a connection detect contact as a function of dendritic growth time according to an embodiment of the present invention. In this figure, a voltage on a CC, CC1, or CC2 contact may fall due to dendritic growth between the contact and ground over time. This voltage may reach a first threshold VTH1 at which point a dedicated downward-facing port, or a dual-role ports acting as a downward-facing port, may detect an erroneous connection. Embodiments of the present invention may attempt to mitigate or limit further dendritic growth such that a second threshold VTH2 is no reached. When voltage threshold VTH2 is reached, a dedicated downward-facing port or dual-role port acting as a downward-facing port, may attempt to deliver power to circuitry in a connector insert.

Again, a dedicated downward-facing port may continuously apply a voltage through resistors to CC1 and CC2 contacts before a connection is made, while a connection is being detected. This continuously applied voltage may encourage the growth of dendrites between CC1 and CC2 contacts and ground when receptacle contacts are exposed, and the growth of dendrites between a CC contact and ground when a cable is connected to the downward-facing port at one end and disconnected at a second end. Accordingly, embodiments of the present invention may limit the time during which this voltage is applied. An example is shown in the following figure.

Figure 7:
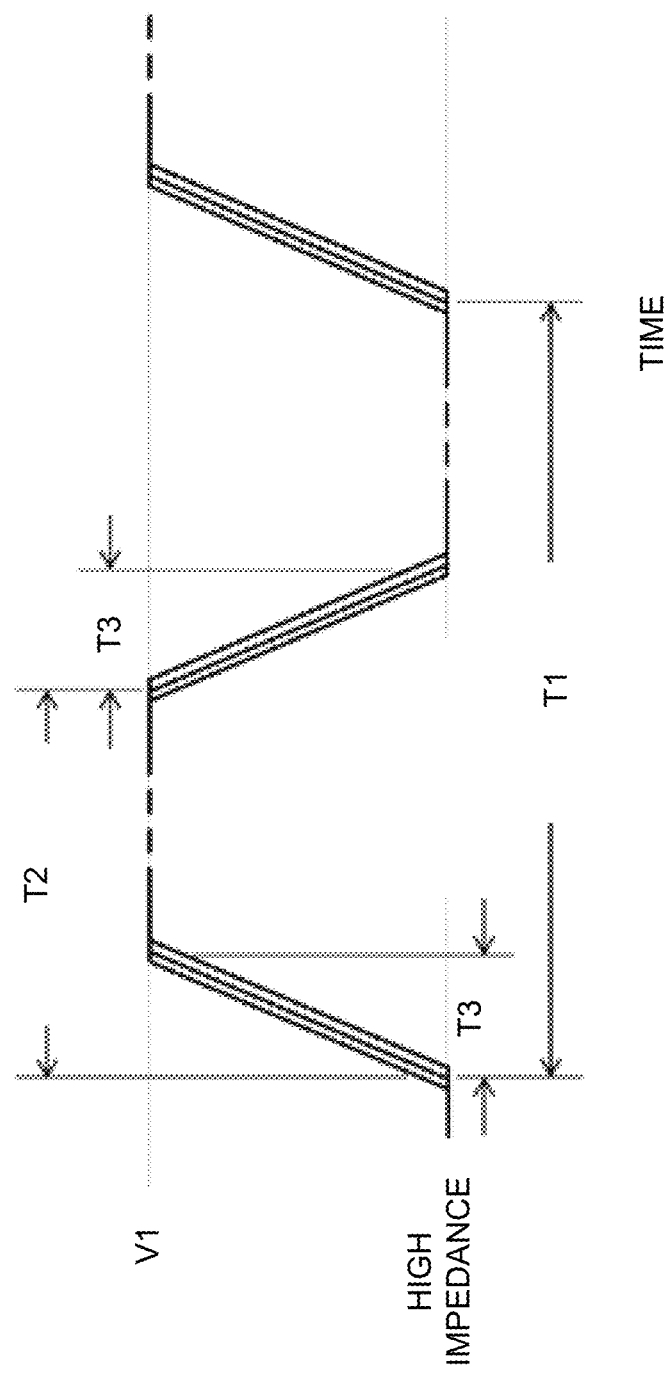
FIG. 7 illustrates a voltage waveform that may be used by a dedicated downward-facing port during connection detection according to an embodiment of the present invention.

FIG. 7 illustrates a voltage waveform that may be used by a dedicated downward-facing port during connection detection. In this example, V1 may vary between a voltage and a high impedance state. When a voltage is being provided by V1, the voltage may be applied through resistors RP in FIG. 4 to contacts CC1 and CC2. This may allow an upward-facing port or a dual-role port acting as an upward-facing port, to form a connection with the dedicated downward-facing port. When a voltage is at high impedance, contacts CC1 and CC2 may appear as open circuits or as high impedances. This high impedance may prevent a second dedicate downward-facing port, or a dual-role port acting as a downward-facing port, from detecting a connection to this dedicated downward-facing port. By limiting an applied voltage at the CC1 and CC2 contacts of the dedicated downward-facing port, dendritic growth on connector receptacle or connector insert pins may be limited or mitigated. This waveform may have cycle time T1 that is between 50 and 100 ms. It may stay in a specific state for a duration T2 that is between 30 and 70 percent of T1 and have a transition time T3 of 0 to 1 ms.

Again, as a voltage on a CC, CC1, or CC2 contact false below a threshold, a downward-facing port may erroneously detect a connection. This may cause the downward-facing port to turn on VBUS. As shown above in FIGS. 2 and 3, VBUS contacts may be adjacent to CC, CC1, and CC2 contacts. Accordingly, the rise in VBUS voltage may cause the corresponding CC, CC1, or CC2 voltage to rise as well. This voltage may rise above the threshold and the downward-facing port may detect a disconnection. Following this disconnection, VBUS may turn off, allowing the voltage on the CC, CC1, or CC2 contacts to fall below the threshold again. The cycle may continue with VBUS turning on and off in this manner. An example is shown in the following figure.

Figure 8:
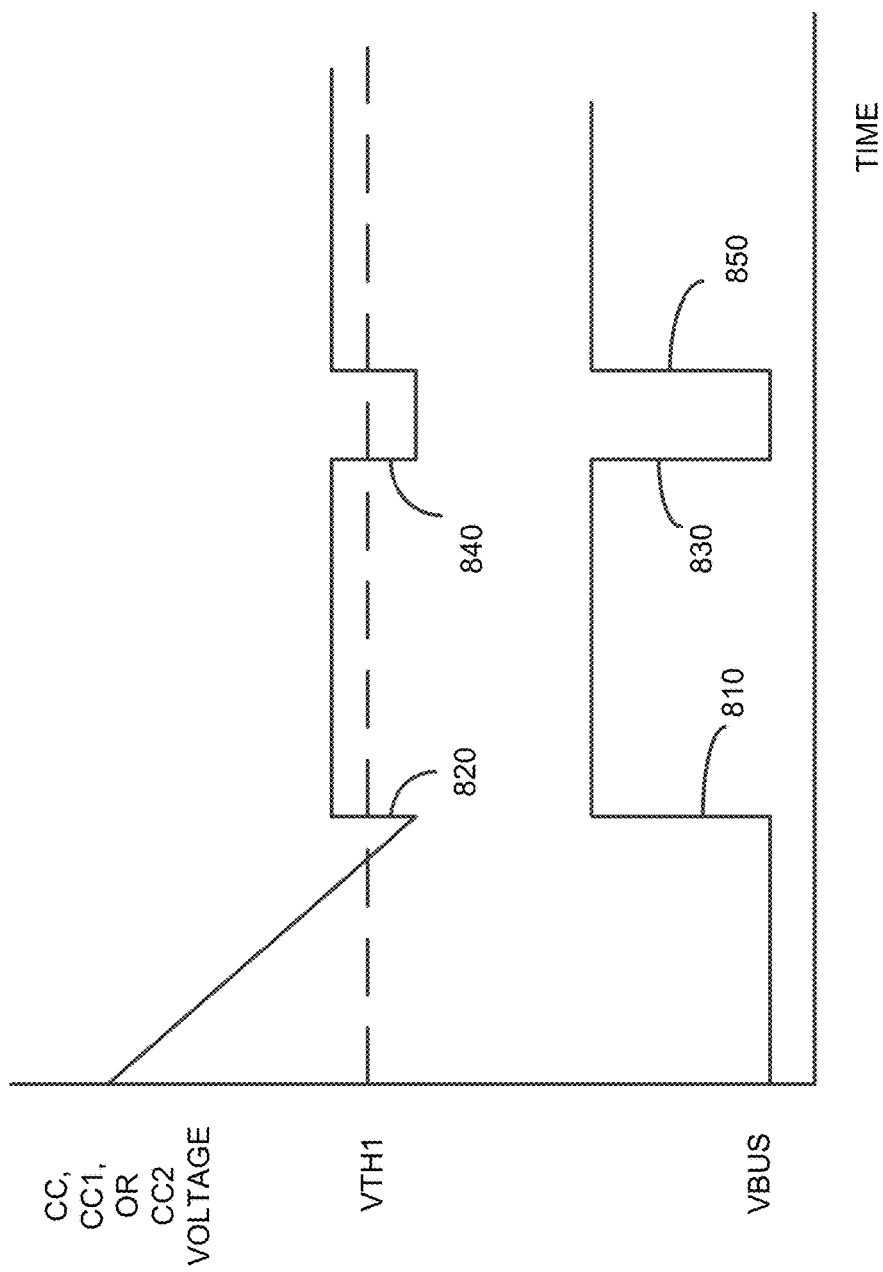
FIG. 8 illustrates power cycling caused by dendritic growth that may be mitigated by an embodiment of the present invention.

FIG. 8 illustrates power cycling caused by dendritic growth that may be mitigated by an embodiment of the present invention. In this example, a voltage on a CC, CC1, or CC2 contact may fall until it reaches a first threshold VTH1. At this time, a downward-facing port may turn on its VBUS generating and edge 810. This increase in VBUS voltage may couple to the CC, CC1, or CC2 contact and increase its voltage at edge 820. Following this rise in voltage, the downward-facing port may detect a disconnection and may thus shut off VBUS at 830. This may in turn allow the CC, CC1, or CC2 contact voltage to drop at 840, which may cause the downward-facing port to erroneously detect and connection and to turn on VBUS again at 850. This cycling may continue in this way. The presence of the VBUS and CC voltages may further encourage dendritic growth. Accordingly, embodiments of the present invention may attempt to mitigate this power cycling. For example, an embodiment of the present invention may prevent a downward-facing port from detecting a connection following a detected disconnect for a first duration. During this first duration, the CC1 and CC2 contacts may be placed in a high-impedance state in order to avoid having a second downward-facing port detect this disabled port as an upward-facing port. Not applying a voltage to the CC1 and CC2 contacts for the first duration may also inhibit dendritic growth. This first duration may be a 0.5, 1.0, 1.5, 2.0 seconds or other duration. An example is shown following figure.

Figure 9:
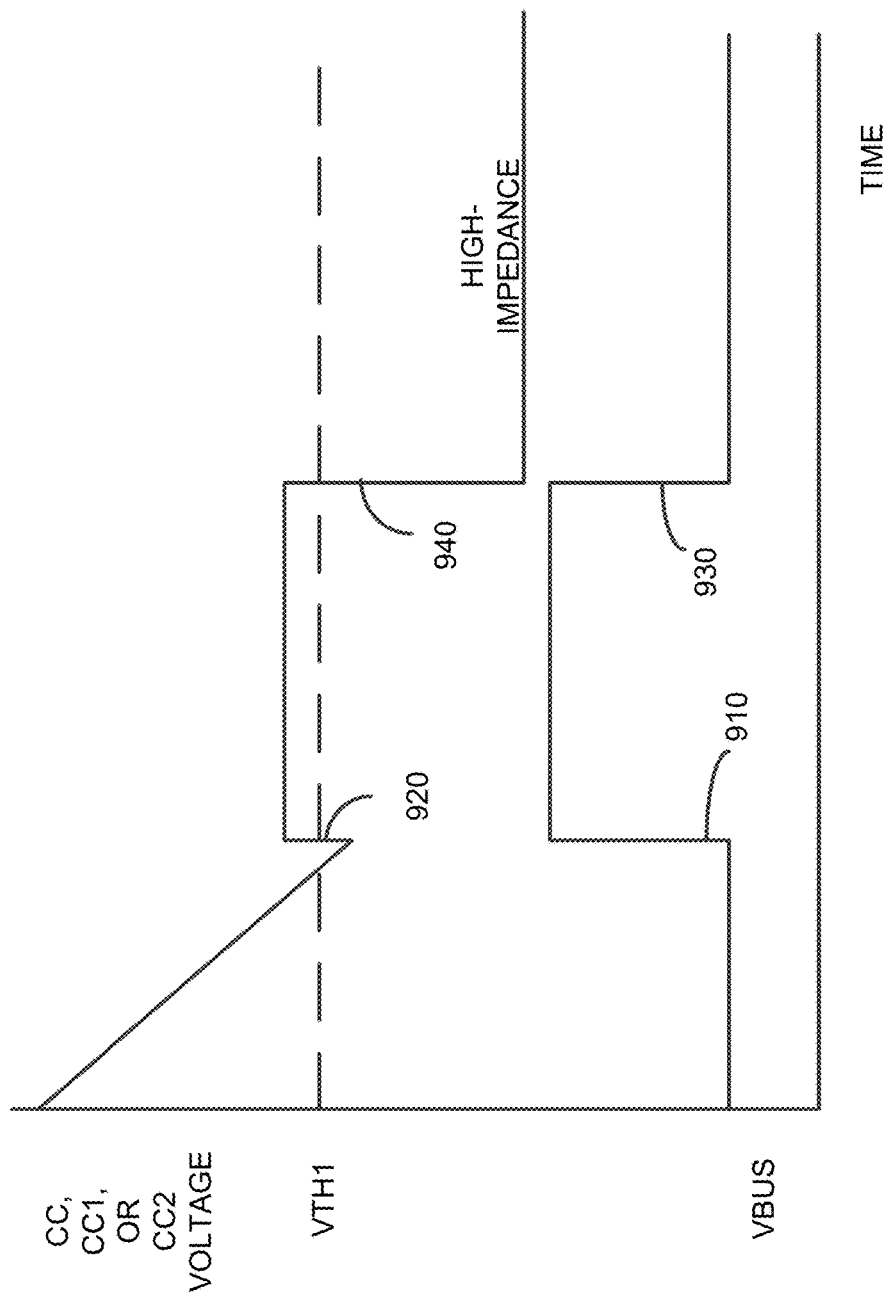
FIG. 9 illustrates power cycling caused by dendritic growth where the power cycling is limited by an embodiment of the present invention.

FIG. 9 illustrates power cycling caused by dendritic growth where the power cycling is limited by an embodiment of the present invention. Again, a voltage on a CC, CC1, or CC2 contact may fall below a threshold voltage due to dendritic inserted growth between the contact and ground. This lower voltage may cause a downward-facing port to turn on VBUS at 910. The rising voltage of VBUS may couple to CC, CC1, or CC2 contacts and may increase the contact voltage. This increased voltage may cause the downward-facing port to detect a disconnection and shut off VBUS at 930. This reduction in VBUS voltage may reduce the voltage on the CC, CC1, or CC2 contact below threshold voltage VTH1.

Instead of immediately detecting a connection and turning on VBUS as before, an illustrative embodiment of the present invention may prevent a downward-facing port from activating VBUS or otherwise detecting a connection for a first duration. This may keep VBUS off for a first duration following edge 930. This reduction in the time VBUS is active may help limit further dendritic growth that may otherwise occur. During this time following edge 940, the CC1 and CC2 contacts may be placed in a high-impedance state. This removal of voltages on the CC1 and CC2 contacts may further limit further dendritic growth. It may also help to avoid having a second downward-facing port detect this disabled port as an upward-facing port.

Again, embodiments of the present invention may limit the time a dedicated downward-facing port provides a voltage at its CC1 and CC2 contacts. This limitation may mitigate the growth of dendrites between the CC1 and CC2 contacts and ground. When a voltage is not provided to the two contacts, the contacts are placed in a high impedance mode. The high impedance mode prevents a second downward-facing port from connecting to the dedicated downward-facing port as if it were an upward-facing port. Also, embodiments of the present invention may reduce the effects of power cycling that may occur by preventing a dedicated downward-facing port from attempting to detect a connection for a first duration following a disconnection. An example of a state diagram that may be used by a dedicated downward-facing port according to an embodiment of the present invention is shown in the following figure.

Figure 10:
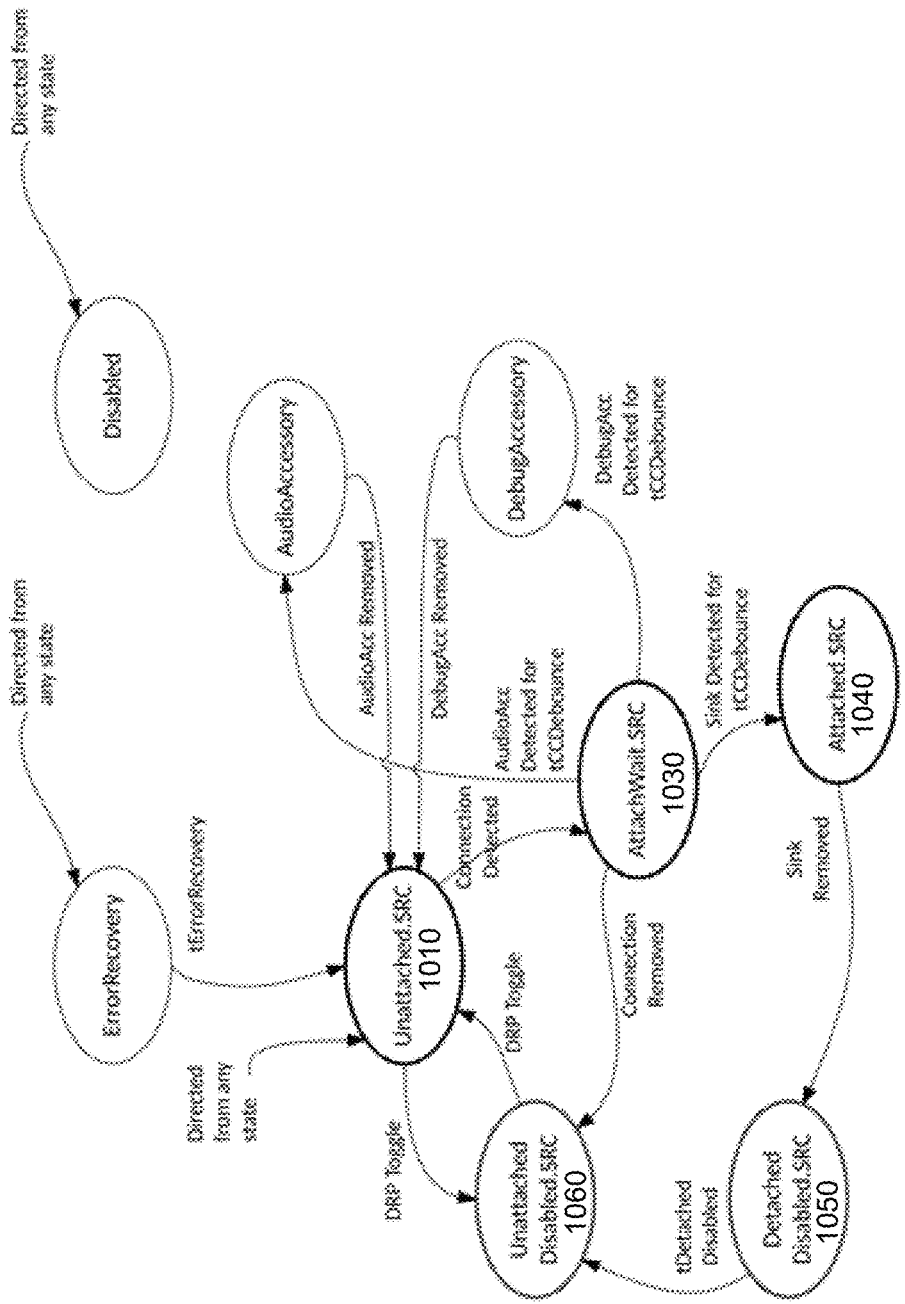
FIG. 10 illustrates a state diagram for a dedicated downward-facing port according to an embodiment of the present invention.

FIG. 10 illustrates a state diagram for a dedicated downward-facing port according to an embodiment of the present invention. During connection detection, the dedicated downward-facing port may alternate between in unattached state 1010 in which it provides a voltage through resistors to its CC1 and CC2 contacts, and an unattached disabled state 1060, in which the CC1 and CC2 contacts are in a high impedance or open circuit state. Once a connection is detected and a wait state 1030 has passed, the dedicated downward-facing port may enter attached state 1040. Following a disconnection, the dedicated downward-facing port may enter a disabled state 1050. In this disabled state 1050, the dedicated downward-facing port does not attempt to detect a connection. The CC1 and CC2 contacts may be in a high-impedance state during this time. Again, this may prevent a power cycling as shown in FIG. 8 from occurring. After a first duration has passed, the dedicated downward-facing port may continue to toggle between the unattached state 1010 and the unattached disabled state 1060.

Again, embodiments of the present invention may prevent this power cycling from occurring in a dual-role port. An example of a state diagram that may be used by dual-role ports according to an embodiment of the present invention is shown in the following figure.

Figure 11:
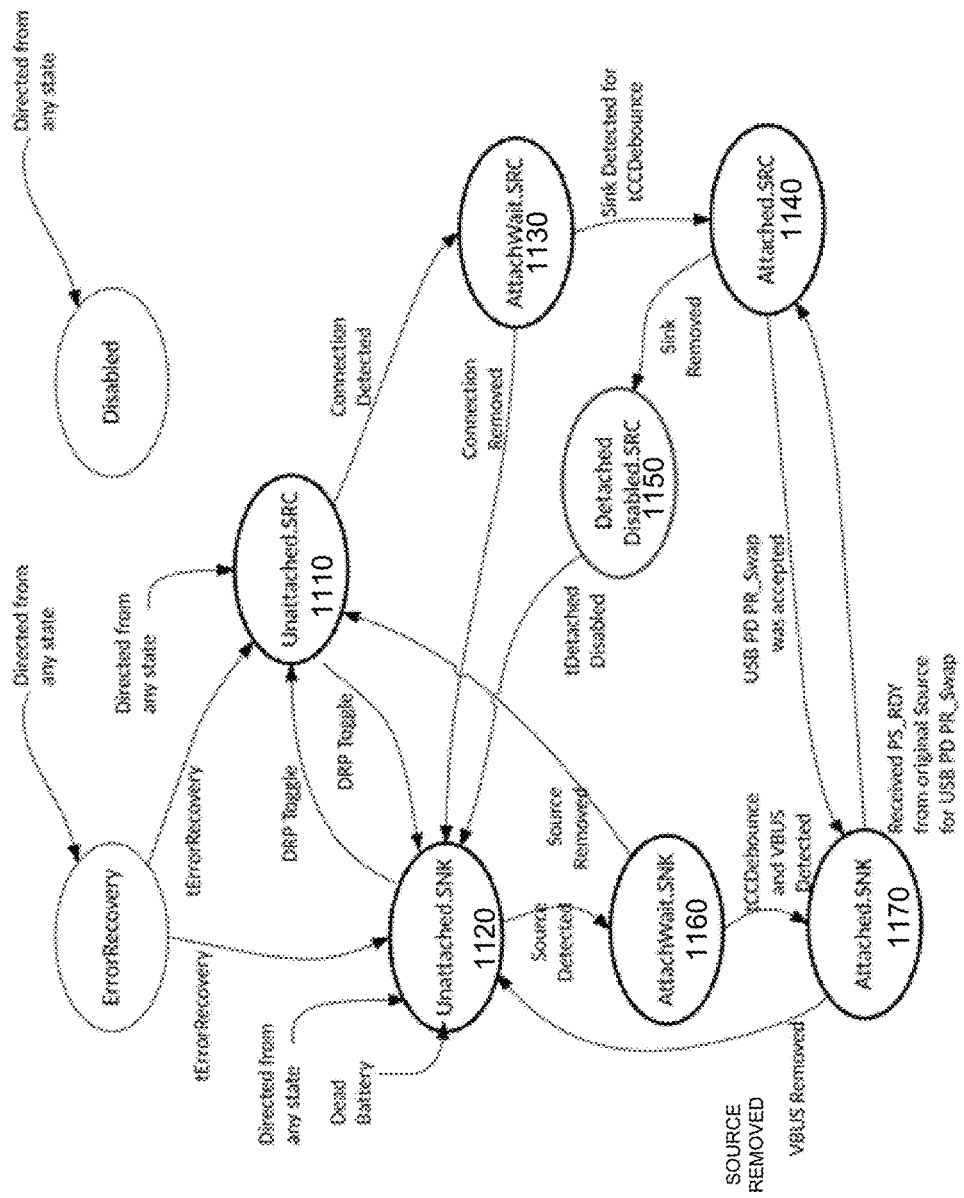
FIG. 11 illustrates a state diagram for a dual-role port according to embodiment of the present invention.

FIG. 11 illustrates a state diagram for a dual-role port according to embodiment of the present invention. During connection detection, the dual-role port may alternate between an unattached source state 1110 and an unattached sink state 1120. While in the unattached source state 1110, when a detection is made, the dual-role port may wait a time in state 1130 before entering an attached source state 1140. Following a disconnection, the dual-role port may be disabled for a first period of time in state 1150 before it may again seek a connection. In this disabled state 1150, the dual-role port does not attempt to detect a connection. The CC1 and CC2 contacts may be in a high-impedance state during this time. While in the unattached sink state, if a source is detected, the dual-role port may enter an attached sink state after a first duration in state 1160. When the source is removed, the dual-role port may resume searching for a connection in state 1120.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of operation of a dedicated downward-facing port for a USB Type-C™ interface, the method comprising:
    applying a first voltage to a first end of a first resistor, where a second end of the first resistor is connected to a CC1 contact of the dedicated downward-facing port and applying the first voltage to a first end of a second resistor, where a second end of the second resistor is connected to a CC2 contact of the dedicated downward-facing port for a first duration; then
    providing an open circuit at the CC1 contact of the dedicated downward-facing port and an open circuit at the CC2 contact of the dedicated downward-facing port for a second duration;
    detecting a connection to the dedicated downward-facing port;
    detecting a disconnection from the dedicated downward-facing port; then
    waiting a third duration; then
    applying the first voltage to the first end of the first resistor and applying the first voltage to the first end of the second resistor.

2. The method of claim 1 wherein the first duration plus the second duration are a total duration between 50 ms and 100 ms.

3. The method of claim 1 further comprising, while waiting a third duration:
    providing the open circuit at the CC1 contact and the open circuit at the CC2 contact.

4. The method of claim 2 wherein the first duration is between 30 and 70 percent of the total duration.

5. The method of claim 3 wherein the third duration is between 0.5 and 2.0 seconds.

6. The method of claim 3 wherein the third duration is approximately 1.0 seconds.

7. A method of operation a dual-role port for a USB Type-C™ interface, the method comprising:
    detecting a connection to the dual-role port;
    detecting a disconnection from the dual-role port; then
    waiting a first duration; then
    applying a first voltage to a first end of a first resistor, where a second end of the first resistor is connected to a CC1 contact of the dual-role port and applying the first voltage to a first end of a second resistor, where a second end of the second resistor is connected to a CC2 contact of the dual-role port, further comprising, while waiting the first duration, providing an open circuit at the CC1 contact and an open circuit at the CC2 contact, wherein the first duration is between 0.5 and 2.0 seconds.

8. The method of claim 7 wherein the first duration is approximately 1.0 seconds.

9. A dedicated downward-facing port for a USB Type-C™ interface comprising:
    a first resistor having a first end to receive a voltage and a second end connected to a CC1 contact of the dedicated downward-facing port;
    a second resistor having a first end to receive the voltage and a second end connected to a CC2 contact of the dedicated downward-facing port;
    wherein the dedicated downward-facing port is configured to:

apply a first voltage to a first end of the first resistor and to the first end of the second resistor for a first duration; and provide an open circuit at the CC1 contact of the dedicated downward-facing port and an open circuit at the CC2 contact of the dedicated downward-facing port for a second duration;

detect a connection to the dedicated downward-facing port;

detect a disconnection from the dedicated downward-facing port; then wait a third duration; then apply the first voltage to the first end of a first resistor and apply the first voltage to the first end of a second resistor.

10. The dedicated downward-facing port of claim 9 wherein the dedicated downward-facing port is further configured to, while waiting a third duration:

provide an open circuit at the CC1 contact and an open circuit at the CC2 contact.

11. The dedicated downward-facing port of claim 10 wherein the third duration is between 0.5 and 2.0 seconds.

12. The dedicated downward-facing port of claim 10 wherein the third duration is approximately 1.0 seconds.

13. A dedicated downward-facing port for a USB Type-C™ interface comprising:

a first resistor having a first end to receive a voltage and a second end connected to a CC1 contact of the dedicated downward-facing port;

a second resistor having a first end to receive the voltage and a second end connected to a CC2 contact of the dedicated downward-facing port;

wherein the dedicated downward-facing port is configured to:

apply a first voltage to a first end of the first resistor and to the first end of the second resistor for a first duration; and provide an open circuit at the CC1 contact of the dedicated downward-facing port and an open circuit at the CC2 contact of the dedicated downward-facing port for a second duration, wherein the first duration plus the second duration are a total duration between 50 ms and 100 ms.

14. The dedicated downward-facing port of claim 13 wherein the first duration is between 30 and 70 percent of the total duration.

15. A dual-role port for a USB Type-C™ interface comprising:

a first resistor having a first end to receive a voltage and a second end connected to a CC1 contact of the dual-role port;

a second resistor having a first end to receive the voltage and a second end connected to a CC2 contact of the dual-role port;

wherein the dual-role port is configured to:

detect a connection to the dual-role port;

detect a disconnection from the dual-role port; then wait a first duration; then apply a first voltage to the first end of the first resistor and apply the first voltage to the first end of the second resistor for a first duration, wherein the interface is further configured to, while waiting the first duration, provide an open circuit at the CC1 contact and an open circuit at the CC2 contact, wherein the first duration is between 0.5 and 2.0 seconds.

16. The dual-role port of claim 15 wherein the first duration is approximately 1.0 seconds.

* * * * *